United States Patent
Mizrahi

(10) Patent No.: US 11,294,965 B2
(45) Date of Patent: Apr. 5, 2022

(54) METADATA GENERATION FOR MULTIPLE OBJECT TYPES

(71) Applicant: Marvell World Trade Ltd., St. Michael (BB)

(72) Inventor: Noam Mizrahi, Modi'in (IL)

(73) Assignee: MARVELL ASIA PTE LTD, Singapore (SG)

(*) Notice: Subject to any disclaimer, the term of this patent is extended or adjusted under 35 U.S.C. 154(b) by 62 days.

(21) Appl. No.: 16/262,971

(22) Filed: Jan. 31, 2019

(65) Prior Publication Data
US 2020/0042548 A1 Feb. 6, 2020

Related U.S. Application Data

(60) Provisional application No. 62/712,823, filed on Jul. 31, 2018, provisional application No. 62/714,563, (Continued)

(51) Int. Cl.
*G06F 17/30* (2006.01)
*G06F 16/907* (2019.01)
(Continued)

(52) U.S. Cl.
CPC .......... *G06F 16/907* (2019.01); *G06F 3/0604* (2013.01); *G06F 3/068* (2013.01);
(Continued)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 1,012,909 A 12/1911 Podeyn
6,012,068 A * 1/2000 Boezeman .............. G06F 16/40
(Continued)

FOREIGN PATENT DOCUMENTS

EP 3244347 A1 11/2017

OTHER PUBLICATIONS

International Application # PCT/IB2019/050776 search report dated Mar. 26, 2019.
(Continued)

*Primary Examiner* — Hung D Le

(57) ABSTRACT

Metadata computation apparatus includes a host interface, a storage interface and one or more processors. The host interface is configured to communicate over a computer network with one or more remote hosts. The storage interface is configured to communicate with one or more non-volatile memories of one or more storage devices. The processors are configured to manage local storage or retrieval of media objects in the non-volatile memories, to compute metadata for a plurality of media objects that are stored, or are en-route for storage, on the storage devices, wherein the media objects are of multiple media types, wherein the computed metadata tags a target feature in the media objects of at least two different media types among the multiple media types, and to store, in the non-volatile memories, the metadata tagging the target feature found in the at least two different media types, for use by the hosts.

22 Claims, 5 Drawing Sheets

Related U.S. Application Data filed on Aug. 3, 2018, provisional application No. 62/716,269, filed on Aug. 8, 2018, provisional application No. 62/726,847, filed on Sep. 4, 2018, provisional application No. 62/726,852, filed on Sep. 4, 2018.

(51) Int. Cl.

| | | |
|---|---|---|
| *G06F 16/901* | (2019.01) | |
| *G06F 16/9038* | (2019.01) | |
| *G06F 16/9035* | (2019.01) | |
| *G06F 16/783* | (2019.01) | |
| *G06F 16/387* | (2019.01) | |
| *G06F 16/683* | (2019.01) | |
| *G06F 16/383* | (2019.01) | |
| *G06F 3/06* | (2006.01) | |
| *G06N 3/08* | (2006.01) | |
| *G06F 12/1045* | (2016.01) | |
| *G06F 15/173* | (2006.01) | |
| *H04L 49/901* | (2022.01) | |
| *H04L 67/1097* | (2022.01) | |

(52) U.S. Cl.
CPC .......... *G06F 3/0638* (2013.01); *G06F 3/0659* (2013.01); *G06F 3/0688* (2013.01); *G06F 12/1054* (2013.01); *G06F 15/17331* (2013.01); *G06F 16/383* (2019.01); *G06F 16/387* (2019.01); *G06F 16/683* (2019.01); *G06F 16/783* (2019.01); *G06F 16/901* (2019.01); *G06F 16/9035* (2019.01); *G06F 16/9038* (2019.01); *G06N 3/08* (2013.01); *H04L 49/901* (2013.01); *H04L 67/1097* (2013.01); *G06F 2212/254* (2013.01)

(56) References Cited

U.S. PATENT DOCUMENTS

| | | | | |
|---|---|---|---|---|
| 6,215,749 B1* | 4/2001 | Kim | .................. | G11B 7/005 |
| | | | | 369/124.13 |
| 8,938,492 B1 | 1/2015 | Kelly | | |
| 9,451,329 B2 | 9/2016 | Whitman et al. | | |
| 9,465,892 B2* | 10/2016 | Shamma | ............... | G06F 16/435 |
| 9,639,969 B1 | 5/2017 | Wilson et al. | | |
| 9,966,112 B1* | 5/2018 | Kulkarni | .......... | H04N 21/23418 |
| 2004/0143590 A1 | 7/2004 | Wong et al. | | |
| 2005/0055406 A1 | 3/2005 | Singhai et al. | | |
| 2006/0047706 A1 | 3/2006 | Castro et al. | | |
| 2006/0242178 A1* | 10/2006 | Butterfield | ............ | G06F 16/447 |
| 2006/0274949 A1 | 12/2006 | Gallagher et al. | | |
| 2007/0038647 A1 | 2/2007 | Thomas et al. | | |
| 2007/0156726 A1* | 7/2007 | Levy | ...................... | G06F 21/10 |
| 2008/0195664 A1* | 8/2008 | Maharajh | .............. | H04L 67/306 |
| 2008/0304747 A1* | 12/2008 | Marinkovich | ....... | G11B 27/105 |
| | | | | 382/183 |
| 2009/0077561 A1 | 3/2009 | Feng et al. | | |
| 2009/0132462 A1 | 5/2009 | Szabo | | |
| 2009/0216719 A1 | 8/2009 | Coffman et al. | | |
| 2010/0177938 A1* | 7/2010 | Martinez | ............ | G06K 9/00677 |
| | | | | 382/118 |
| 2010/0179874 A1* | 7/2010 | Higgins | .................. | G06Q 30/02 |
| | | | | 705/14.53 |
| 2011/0235858 A1 | 9/2011 | Hanson et al. | | |
| 2011/0289094 A1* | 11/2011 | Fisher | ..................... | G06F 16/41 |
| | | | | 707/748 |
| 2012/0265735 A1* | 10/2012 | McMillan | ........ | H04N 21/44204 |
| | | | | 707/687 |
| 2012/0278560 A1 | 11/2012 | Benzion et al. | | |
| 2012/0278705 A1 | 11/2012 | Yang et al. | | |
| 2013/0097172 A1* | 4/2013 | McIntosh | ................ | G06F 16/48 |
| | | | | 707/741 |
| 2013/0170813 A1* | 7/2013 | Woods | ................... | H04N 5/765 |
| | | | | 386/200 |
| 2013/0289991 A1* | 10/2013 | Eshwar | .................. | G06Q 50/01 |
| | | | | 704/246 |
| 2013/0297652 A1 | 11/2013 | Higgins et al. | | |
| 2014/0047188 A1 | 2/2014 | Xia | | |
| 2014/0074836 A1* | 3/2014 | Adams | .................. | G06F 16/907 |
| | | | | 707/736 |
| 2014/0074855 A1* | 3/2014 | Zhao | .................. | H04N 21/8455 |
| | | | | 707/746 |
| 2014/0122427 A1 | 5/2014 | Dary | | |
| 2014/0250256 A1 | 9/2014 | Duran | | |
| 2014/0270407 A1 | 9/2014 | Balakrishnan et al. | | |
| 2015/0016691 A1 | 1/2015 | Anbalagan et al. | | |
| 2015/0156263 A1 | 6/2015 | Clayton et al. | | |
| 2016/0036882 A1 | 2/2016 | Jin et al. | | |
| 2016/0170871 A1 | 6/2016 | Hyun et al. | | |
| 2016/0191591 A1 | 6/2016 | Rider et al. | | |
| 2016/0335339 A1* | 11/2016 | Venkataraman | ...... | G06F 16/738 |
| 2016/0378402 A1 | 12/2016 | Amidi et al. | | |
| 2017/0094341 A1* | 3/2017 | Berner | ............. | H04N 21/47217 |
| 2017/0169358 A1 | 6/2017 | Choi et al. | | |
| 2017/0185869 A1 | 6/2017 | Dua et al. | | |
| 2017/0192860 A1 | 7/2017 | Vijayan et al. | | |
| 2017/0193362 A1 | 7/2017 | Cremer et al. | | |
| 2017/0199886 A1 | 7/2017 | Perrine et al. | | |
| 2017/0206030 A1 | 7/2017 | Woo et al. | | |
| 2017/0293431 A1 | 10/2017 | Dor et al. | | |
| 2017/0304732 A1 | 10/2017 | Velic et al. | | |
| 2017/0331893 A1 | 11/2017 | Crofton et al. | | |
| 2018/0004213 A1 | 1/2018 | Absmeier | | |
| 2018/0024770 A1 | 1/2018 | Lee | | |
| 2018/0033208 A1 | 2/2018 | Martin | | |
| 2018/0189615 A1 | 7/2018 | Kang et al. | | |
| 2018/0307609 A1 | 10/2018 | Qiang et al. | | |
| 2018/0329786 A1 | 11/2018 | Gokhale | | |
| 2019/0065054 A1 | 2/2019 | Park | | |
| 2019/0138617 A1* | 5/2019 | Farre Guiu | ........ | H04N 21/8456 |
| 2019/0278704 A1 | 9/2019 | Lee | | |
| 2020/0042888 A1 | 2/2020 | Yu et al. | | |

OTHER PUBLICATIONS

Mizrahi et al., U.S. Appl. No. 16/262,975, filed Jan. 31, 2019.
Kudryavtsev et al., U.S. Appl. No. 16/263,387, filed Jan. 31, 2019.
Varnica et al., U.S. Appl. No. 16/264,248, filed Jan. 31, 2019.
Therene et al., U.S. Appl. No. 16/264,473, filed Jan. 31, 2019.
International Application # PCT/IB2019/056442 search report dated Dec. 12, 2019.
U.S. Appl. No. 16/262,975 Office Action dated Nov. 4, 2020.
IEEE Std 802.3ch-2020, "IEEE Standard for Ethernet, Amendment 8: Physical Layer Specifications and Management Parameters for 2.5 Gb/s, 5 Gb/s and 10 Gb/s Automotive Electrical Ethernet", pp. 1-207, Jun. 4, 2020.
IEEE Std 802.3bp-2016, "IEEE Standard for Ethernet, Amendment 4: Physical Layer Specifications and Management Parameters for 1 Gb/s Operation over a Single Twisted-Pair Copper Cable", pp. 1-211, Jun. 30, 2016.
IEEE Std 802.3bw-2015, "IEEE Standard for Ethernet, Amendment 1: Physical Layer Specifications and Management Parameters for 100 Mb/s Operation over a Single Balanced Twisted Pair Cable (100BASE-T1)", pp. 1-88, Oct. 26, 2015.
IEEE Std 802.3cg-2019, "IEEE Standard for Ethernet, Amendment 5: Physical Layers Specifications and Management Parameters for 10 Mb/s Operation and Associated Power Delivery over a Single Balanced Pair of Conductors", pp. 1-256, Nov. 7, 2019.
U.S. Appl. No. 16/264,248 Office Action dated Nov. 3, 2020.
U.S. Appl. No. 16/264,248 office action dated Feb. 23, 2021.
International Application # PCT/IB2020/061625 Search Report dated May 18, 2021.
U.S. Appl. No. 16/264,248 Office Action dated Jul. 9, 2021.
U.S. Appl. No. 16/264,248 Office Action dated Dec. 13, 2021.
EP Application # 19707121.0 Office Action dated Jan. 11, 2022.

(56) References Cited

OTHER PUBLICATIONS

EP Application # 19762480.2 Office Action dated Feb. 10, 2022.

* cited by examiner

METADATA GENERATION FOR MULTIPLE OBJECT TYPES

CROSS-REFERENCE TO RELATED APPLICATIONS

This disclosure claims the benefit under 35 U.S.C. § 119(e) of commonly-assigned United States Provisional Patent Applications Nos. 62/712,823, filed Jul. 31, 2018; 62/714,563, filed Aug. 3, 2018; 62/716,269, filed Aug. 8, 2018; 62/726,847, filed Sep. 4, 2018; and 62/726,852, filed Sep. 4, 2018. Each of the following commonly-assigned United States non-provisional patent applications also claims the benefit of the aforementioned United States provisional patent applications, and is being filed concurrently herewith:

1. U.S. patent application Ser. No. 16/263,387, filed Jan. 31, 2019, entitled "SYSTEMS AND METHODS FOR GENERATING METADATA DESCRIBING UNSTRUCTURED DATA OBJECTS AT THE STORAGE EDGE";
2. U.S. patent application Ser. No. 16/264,473, filed Jan. 31, 2019, entitled "STORAGE EDGE CONTROLLER WITH A METADATA COMPUTATIONAL ENGINE";
3. U.S. patent application Ser. No. 16/264,248, filed Jan. 31, 2019, entitled "STORAGE AGGREGATOR CONTROLLER WITH METADATA COMPUTATION CONTROL"; and
4. U.S. patent application Ser. No. 16/262,975, filed Jan. 31, 2019, entitled "METADATA GENERATION AT THE STORAGE EDGE".

FIELD OF THE DISCLOSURE

The present disclosure relates generally to processing of media objects, and particularly to methods and systems for generation of metadata for media objects.

BACKGROUND

Various systems and applications involve analysis of large volumes of content, such as textual items, videos, images, voice files and sensor data, to name just a few examples. Some analysis tasks use metadata that is associated with the content.

The description above is presented as a general overview of related art in this field and should not be construed as an admission that any of the information it contains constitutes prior art against the present patent application.

SUMMARY

An embodiment that is described herein provides a metadata computation apparatus including a host interface, a storage interface and one or more processors. The host interface is configured to communicate over a computer network with one or more remote hosts. The storage interface is configured to communicate with one or more non-volatile memories of one or more storage devices. The one or more processors are configured to manage local storage or retrieval of media objects in the one or more non-volatile memories, to compute metadata for a plurality of the media objects that are stored, or that are en-route to be stored, on the one or more storage devices, wherein the media objects are of multiple media types, wherein the computed metadata tags a target feature in the media objects of at least two different media types among the multiple media types, and to store, in the one or more non-volatile memories, the metadata tagging the target feature found in the at least two different media types, for use by the one or more hosts.

In some embodiments, at least some of the media objects are unstructured media objects, and, in computing the metadata, the one or more processors are configured to tag locations at which the target feature appears in the unstructured media objects. In an embodiment, for a media item that includes a sequence of frames, the one or more processors are configured to tag the locations by identifying and tagging one or more of the frames in which the target feature appears. In an example embodiment, wherein, for a media item that includes at least a frame, the one or more processors are configured to tag the locations by identifying and tagging one or more coordinates in the frame in which the target feature appears. In a disclosed embodiment, the one or more processors are configured to compute the locations in accordance with multiple different location metrics defined for the respective media types.

In some embodiments, the one or more processors are configured to receive from the one or more hosts, over the computer network, one or more models that specify extraction of the metadata from the media objects, and to generate the metadata based on the received models. In an embodiment, the one or more processors are configured to receive from the one or more hosts a respective model for each of the multiple media types. In an example embodiment, the one or more processors are configured to receive, as the one or more models, one or more pre-trained Artificial Intelligence (AI) models. In a disclosed embodiment, the one or more processors are configured to generate the metadata by applying a same AI inference engine to the AI models.

In another embodiment, the one or more processors are configured to organize the media objects in multiple batches corresponding to the media types, and to compute the metadata over each of the batches. In yet another embodiment, the one or more processors are configured to generate the metadata during idle periods during which at least some resources of the one or more processors are free from managing storage of the media objects.

In still another embodiment, the one or more processors are configured to combine, in a unified metadata database, metadata that tags the target feature and that was extracted from different media sources or extracted by different processors. Additionally or alternatively, the one or more processors are configured to combine the metadata, which tags the target feature, in a unified metadata database that identifies at least one attribute selected from a group of attributes consisting of a media type, a file identifier of a file containing the media object, and a location of the media object within the file.

There is additionally provided, in accordance with an embodiment that is described herein, a method for metadata computation. The method includes communicating by a storage controller of one or more storage devices over a computer network with one or more remote hosts, and communicating with one or more non-volatile memories of the one or more storage devices. Local storage or retrieval of media objects in the one or more non-volatile memories is managed using the storage controller. Further using the storage controller, metadata is computed for a plurality of the media objects that are stored, or that are en-route to be stored, on the one or more storage devices. The media objects are of multiple media types, and the computed metadata tags a target feature in the media objects of at least two different media types among the multiple media types. The metadata, which tags the target feature found in the at least two different media types, is stored in the one or more non-volatile memories for use by the one or more hosts.

There is also provided, in accordance with an embodiment that is described herein, a metadata computation apparatus including a host interface, a storage interface and one or more processors. The host interface is configured to communicate over a computer network with one or more remote hosts. The storage interface is configured to communicate with one or more non-volatile memories of one or more storage devices. The one or more processors are configured to compute metadata for a plurality of media objects that are stored, or that are en-route to be stored, on the one or more storage devices, wherein the media objects are of multiple media types, wherein the computed metadata tags a target feature in the media objects of at least two media types among the multiple media types, and to store the metadata for use by the one or more hosts.

There is further provided, in accordance with an embodiment that is described herein, a method for metadata computation. The method includes communicating by a storage controller of one or more storage devices over a computer network with one or more remote hosts, and communicating with one or more non-volatile memories of the one or more storage devices. Using the storage controller, metadata is computed for a plurality of media objects that are stored, or that are en-route to be stored, on the one or more storage devices, wherein the media objects are of multiple media types, and wherein the computed metadata tags a target feature in the media objects of at least two of the media types, and the metadata is stored for use by the one or more hosts.

The present disclosure will be more fully understood from the following detailed description of the embodiments thereof, taken together with the drawings in which:

DETAILED DESCRIPTION OF EMBODIMENTS

Figure 1:
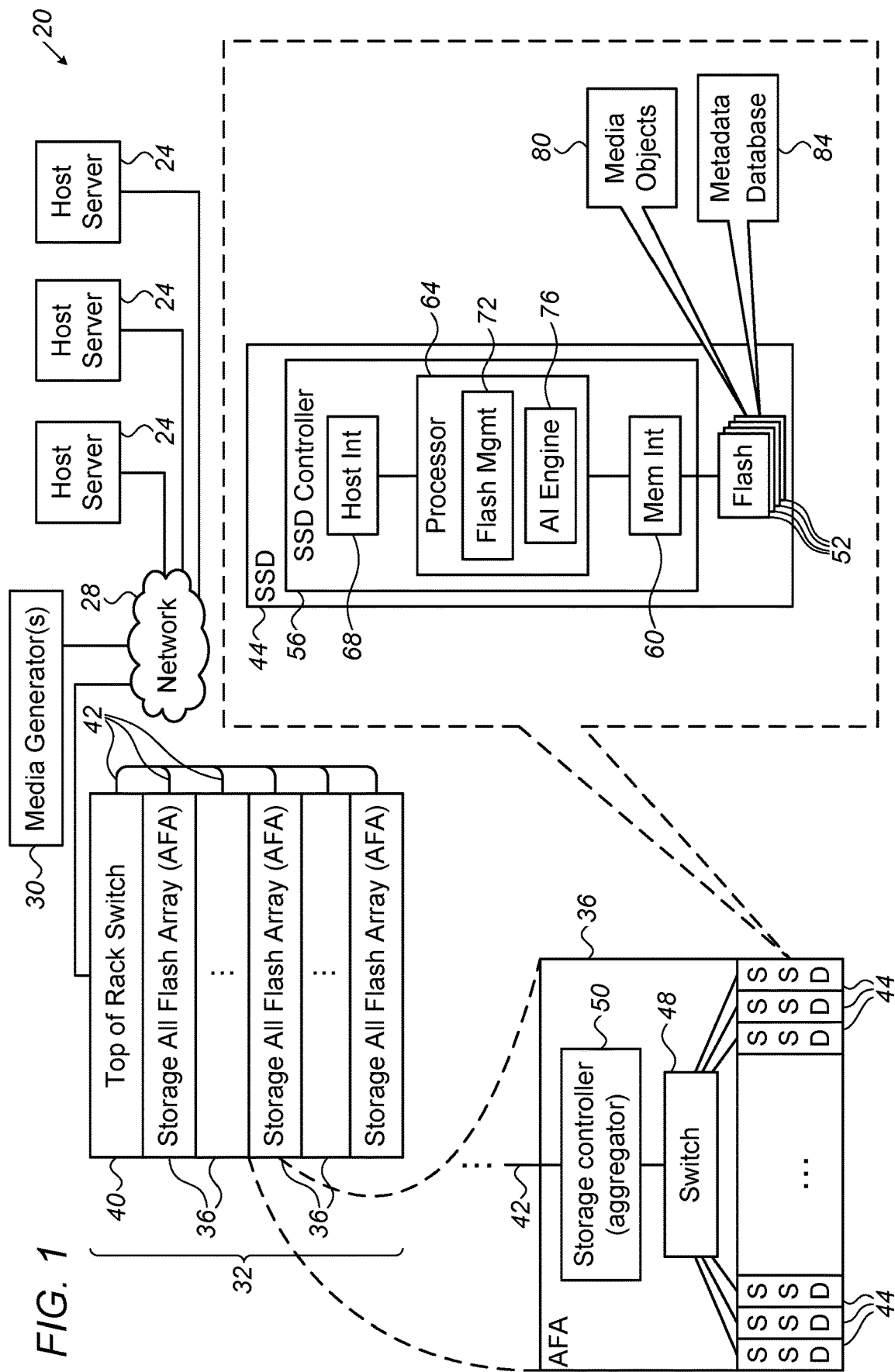
FIG. 1 is a block diagram that schematically illustrates a data center that performs metadata generation at the storage edge, in accordance with an embodiment that is described herein.

Embodiments that are described herein provide improved methods and systems for generating metadata for media objects, and for storing and using such metadata, in data processing systems.

In some embodiments, a data processing system is used for storing and analyzing a large volume of content data contained in media objects. Some non-limiting examples of object analysis applications include identification of persons of interest or other objects in video footage of security cameras, customized insertion of advertisements ("ads") into streamed videos, analytics of data from autonomous vehicles, analytics of call and response quality in a ChatBot Voice calls data base, text documents and/or text messages database analysis, mood detection, scene identification within a video file or Voice call, identification of persons or objects in surveillance footage, identification of types of actions occurring in surveillance footage, identification of voices or types of sounds in recordings, classification of phrases and/or responses used during conversation, analysis of automotive sensor data and driving responses, and many others.

Examples of media objects include videos, sound recordings, still images, textual objects such as text messages and e-mails, data obtained from various types of sensors such as automotive sensors and Internet-of-Things (IoT) sensors, database objects, and/or any other suitable objects. Media objects are also referred to herein simply as "objects" for brevity.

Typically, the system generates metadata for the media objects and performs the desired analysis, or executes an action, based on the metadata. In a system for ad insertion, for example, the system would typically analyze each streamed video, divide the video into scenes, estimate a sentiment associated with each scene, people and/or objects in the scene, identify the context of speech in the scene, and store the estimated scene-sentiments and other information as metadata associated with the video. Based on this metadata, the system can then choose where in the video to insert a given ad in order to maximize the ad's impact.

As another example in an entirely different field, a data processing system is used for off-line analysis of data acquired by cameras and other sensors of an autonomous car. In this example, the system may scan the video acquired by the car cameras and/or outputs of other car sensors, identify events that are pre-classified by the AI model as being of interest, and tag them as metadata. The system can then use the metadata to investigate the identified events.

In an example embodiment, in an automotive system, extremely large quantities of sensor data are generated. Metadata is generated on the storage side of a vehicle that is periodically connected to a network. The metadata is used to select portions of relevant sensor data to be at least temporarily stored at a storage device in the vehicle, or discarded. Metadata along with selected relevant objects are then periodically uploaded over a network connection to a central processor where the metadata objects are analyzed and can be applied for various purposes such as improving the behavior of autonomous vehicles, or determining targeted advertisements that are to be conveyed to users of the vehicle.

In many cases, the media objects are unstructured. In the present context, the term "unstructured object" means that the media content of the object (e.g., textual content, audio content, image content or video content) is provided in raw form and is not organized in advance according to a fixed field format. Typically, an unstructured object is not tagged a-priori with metadata that defines any aspects of the content per frame or other content portion. Typically, unstructured data is non-transactional, and its format does not readily conform to a relational database schema.

Metadata can be generated from media objects, which are almost always unstructured, in various ways. One possibility is to use an Artificial Intelligence (AI) model, e.g., a neural network. In a typical implementation, an AI model is trained using a "training set"—a body of media objects and corresponding metadata that is known to be accurate. The trained model is then applied to generate metadata for other media objects. A software or hardware module that receives a pre-trained AI model and uses it to compute metadata of objects is referred to herein as an "AI inference engine." In some implementations, several different AI models will be applied to unstructured or partially structured media objects.

Embodiments that are described herein provide methods and systems for generating, storing and using metadata relating to target features that are common to media objects of multiple different media types. In one illustrative example, the target feature is a person of interest. Occurrences of this target feature in media objects of different media types may comprise, for example, references to the person in database files, e-mails and/or text messages, appearances of the person's face in images, videos and/or Web pages, appearances of the person's voice in audio recordings, and the like.

In many practical applications it is highly desirable to be able to analyze occurrences of a target feature (e.g., a person) jointly across multiple media types.

In some embodiments, a data processing system comprises one or more host servers ("hosts") that analyze media objects, and one or more storage devices in which the media objects are stored. The hosts and the storage devices communicate over a computer network. In various embodiments, a processor in the data processing system computes metadata for a plurality of media objects that are stored, or that are en-route to be stored, on the storage devices. Among other features, the computed metadata tags a certain target feature in media objects of at least two of the multiple media types.

In an embodiment, the processor creates and maintains a unified metadata database that indexes and stores metadata of media objects of different media types, in accordance with the target feature.

For example, when the target feature is a person of interest, in some embodiments the metadata tags e-mail or other textual media objects that refer to the person, database files in which the person is listed, images and/or videos in which the person's face appears, and/or audio files in which the person's voice can be found. In an embodiment, the processor uses a common identifier to tag the target feature (the person of interest in this example) across the multiple different media types. In another embodiment the metadata is grouped by target features. Any other suitable data structure or representation can be used.

The processor typically makes the unified metadata database accessible to the hosts. In this manner, the hosts are able to retrieve and analyze metadata and objects of different media types that relate to the target feature.

In some embodiments, the metadata is indicative of the locations within the media objects in which the target feature appears. The locations may comprise, for example, a frame number or elapsed time from the beginning of a video, coordinates within a frame in a video or still image, elapsed time in an audio file, or the number of words from the beginning of a textual object.

In some embodiments the processor runs an AI inference engine, which is configured to run AI models that compute metadata for media objects. The AI model typically differs from one media type to another, e.g., the AI model for e-mail messages differs from the AI model for videos. In an example embodiment, the processor loads an AI model of a certain media type, and then computes metadata for a batch of objects of that type, before switching to an AI model of another media type. This batched mode of operation is efficient, since the AI model is replaced at large intervals.

In some embodiments, the processor that performs metadata generation is located at the storage edge, close to the locations at which the objects are stored, rather than at one centralized location which conventionally requires the transport of a very large body of media object data through a network between storage and processing devices.

In the present context, the term "at the storage edge" means at a processor or processors that are located on the storage-device side of the network, as opposed to the host-side of the network. In other words, a processor at the storage edge needs to send and/or receive information across the network in order to communicate with the hosts, but does not need to send and/or receive information across the network in order to communicate with the storage device. Non-limiting examples of storage-edge processors, as elaborated below, include Solid State Drive (SSD) controllers, processors in storage-array controllers (also referred to as aggregators), and processors in connected storage-edge appliances such as autonomous vehicles.

FIG. 1 is a block diagram that schematically illustrates a data processing system 20, in the present example a data center, which performs metadata generation at the storage edge, in accordance with an embodiment that is described herein. System 20 is used for storing a large number of objects, calculating metadata for the objects, and analyzing the objects based on the metadata, as explained above. In some embodiments system 20 receives, stores and analyzes objects of multiple different types.

In the embodiment of FIG. 1, data processing system 20 comprises one or more host servers 24 that communicate over a computer network 28. Host servers 24 are also referred to herein simply as "hosts" for brevity. Computer network 28 may comprise any suitable type of network, e.g., a Local Area Network (LAN), Wide Area Network (WAN), cloud network, data center network or the like. In an embodiment, system 20 comprises one or more media generators 30 that generate the media objects being stored and analyzed.

System 20 further comprises a remote storage rack 32, which is used by hosts 24 for storing objects, metadata and other relevant data. In some embodiments, storage rack 32 is part of a Storage Area Network (SAN) that communicates with network 28. Hosts 24 communicate with storage rack 32 over network 28 for storing and retrieving data.

In the example of FIG. 1, storage rack 32 comprises multiple storage units referred to as All-Flash Arrays (AFAs) 36. (In alternative embodiments, any other suitable type of storage units, and any other suitable type of storage devices, not necessarily Flash-based, can be used.) A Top-Of-Rack (TOR) switch 40 manages the communication between AFAs 36 and hosts 24 over network 28. In the present example, storage rack 32 including its various components is regarded as located "at the storage edge" of system 20.

An inset at the bottom-left of FIG. 1 shows the internal structure of AFA 36, in an embodiment. As seen, AFA 36 comprises multiple Solid State Drives (SSDs) 44 in which the data (e.g., objects and metadata) is stored. AFA 36 comprises a storage controller 50, which is configured to manage storage of data (e.g., media objects). Storage controller 50 is also referred to herein as an aggregation processor or aggregator. AFA 36 further comprises a switch 48 that is configured to communicate with TOR switch 40 over a suitable network cable 42.

In some embodiments, switch 48 communicates with SSDs 44 over a common Peripheral Component Interconnect Express (PCIe) bus, e.g., using the Non-Volatile Memory Express (NVMe) protocol. In other embodiments, hosts 24 communicate with SSDs 44 via switch 48 using Ethernet, e.g., using the NVMe-over-fabrics protocol. Further alternatively, other suitable protocols can be used. Communication between switch 48 and TOR switch 40 is typically conducted using Ethernet. In an embodiment, although not necessarily, AFA 36 comprises a Central Processor Unit (CPU) and/or Network Interface Controller (NIC), not shown in the figure, for communicating with TOR switch 40.

An inset at the bottom-right of the figure shows the internal structure of SSD 44, in accordance with an embodiment that is described herein. In the present embodiment, each SSD 44 comprises a plurality of Flash memory devices 52, e.g., NAND Flash memories, and an SSD controller 56. SSD controller 56 comprises a memory interface 60 for communicating with Flash devices 52, a host interface 68 for communicating with hosts 24 (via switch 48 and TOR switch 40), and a processor 64. Host interface 68 may communicate with hosts 24 using any suitable storage protocol, for example Non-Volatile Memory Express (NVMe) or Serial Advanced Technology Attachment (SATA).

As will be explained in detail below, processor 64 performs both storage/retrieval tasks and metadata computation tasks. Non-limiting examples of metadata computation tasks include identification, description and/or tagging of objects, activities, scene characteristics and other features of content within media objects. In yet other embodiments, metadata computation tasks are performed by storage controller (aggregator) 50.

In an embodiment, processor 64 comprises a Flash management module 72 and an Artificial Intelligence (AI) inference engine 76. Flash management module 72 is configured to store and retrieve data (e.g., objects and metadata) in Flash devices 52. The tasks of Flash management module 72 are also referred to as "Flash Translation Layer" (FTL). AI inference engine 76 is configured to compute metadata for media objects, as explained below. In an embodiment, SSD controller 56 stores in Flash devices 52 (i) media objects 80 and (ii) a metadata database 84 that holds the metadata of media objects 80.

Note that the SSD configuration of FIG. 1 is a non-limiting example configuration, and that any other suitable SSD controller can be used in alternative embodiments. For example, an alternative embodiment, in which the SSD controller comprises multiple Integrated Circuits (ICs) that communicate with one another via a suitable fabric, is described in FIG. 3 below.

Figure 2:
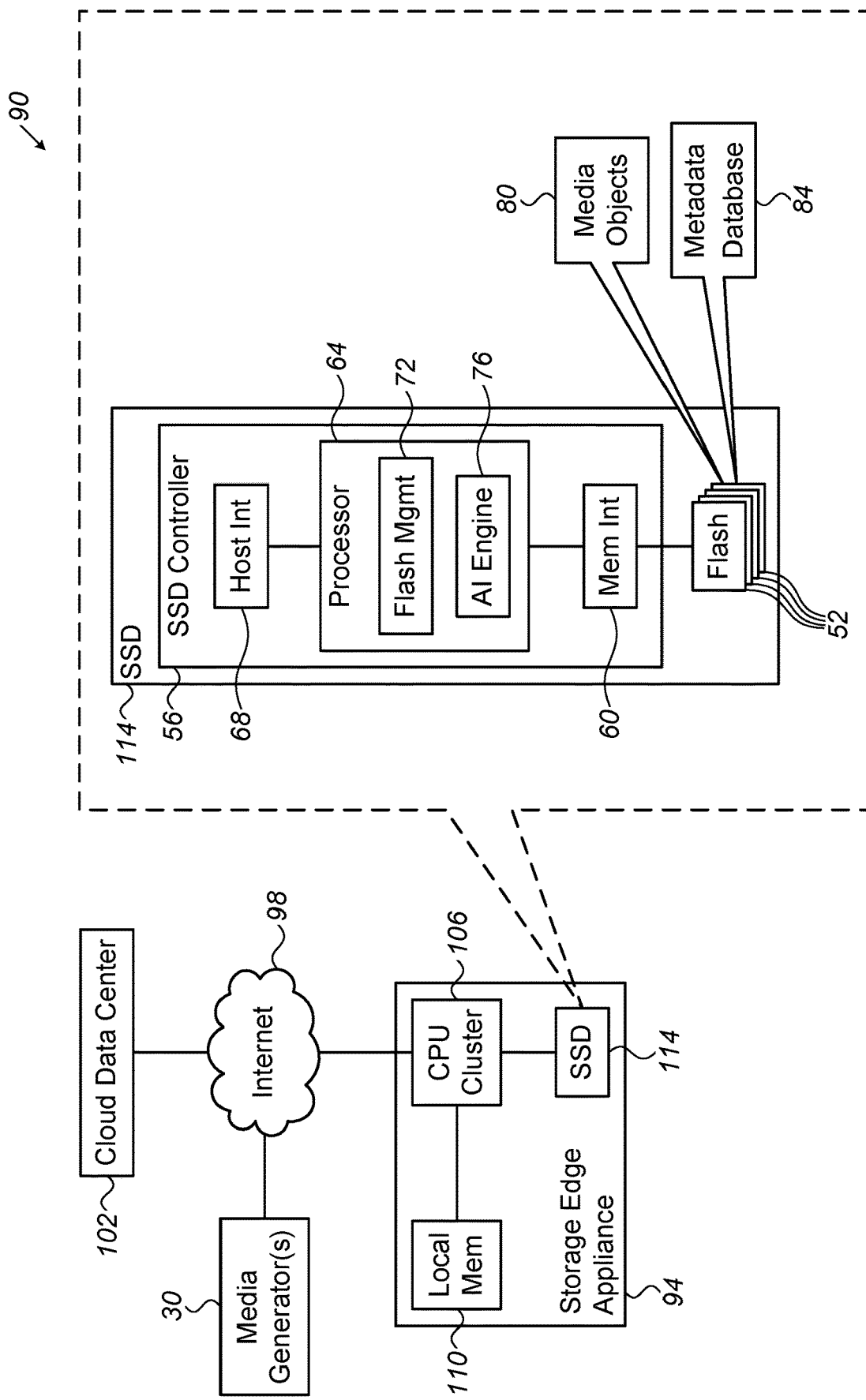
FIG. 2 is a block diagram that schematically illustrates an edge appliance that performs local metadata generation, in accordance with an embodiment that is described herein.

FIG. 2 is a block diagram that schematically illustrates a data processing system 90 in which an edge appliance 94 performs local metadata generation, in accordance with an embodiment that is described herein. Edge appliance 94 comprises, for example, an autonomous car, a surveillance box, an IoT device, or any other suitable type of edge device, in an embodiment.

In an embodiment, edge appliance 94 communicates with a cloud-based data center 102 via a computer network, in the present example the Internet. Data center 102 comprises one or more hosts (not shown). Edge appliance 94 comprises a Central Processing Unit (CPU) cluster 106, a local memory 110 (typically a Random Access Memory (RAM) or other volatile memory), and an SSD 114. The internal structure of SSD 114, in an embodiment, is shown in an inset on the right-hand side of the figure. The structure of SSD 114 is similar to that of SSD 44 of FIG. 1.

The metadata in local databases 84 of the various SSDs 44 is accessible for use by hosts 24. In some embodiments, a host 24 reads the metadata, and possibly associated objects or parts thereof, from SSD 44. In an alternative embodiment, processor 64 of SSD controller 56 receives from a host 24 a request for certain metadata, and sends the requested metadata to the requesting host in response. In some embodiments, in addition to the requested metadata, processor 64 also sends to the requesting host one or more related media objects, or parts thereof. In other embodiments, processor 64 sends some or even all of the metadata to hosts 24 proactively, i.e., regardless of any request from the hosts. In an embodiment, a host 24 analyzes the metadata and requests selected segments of object media based on analysis of the metadata.

In some embodiments, an analysis task of a host 24 requires the use of metadata from multiple metadata databases 84 of different SSDs 44. In such embodiments, the host typically obtains the relevant metadata from the multiple SSDs, and consolidates the metadata as needed.

In some embodiments, the AI model and the objects for storage are received from the same host 24. In other embodiments, the AI model and the objects for storage are received from different hosts 24.

In some embodiments, the data storage process and the metadata generation process are carried out concurrently. In some embodiments, processor 64 gives higher priority to storage/retrieval of objects than to metadata generation. As noted above, in some embodiments AI inference engine 76 generates the metadata during idle periods during which at least some resources of processor 64 are free from managing the storage/retrieval of objects. In an example embodiment, processor 64 identifies such idle periods in real time, and initiates or resumes metadata generation during the identified idle periods. Processor 64 suspends generation of metadata outside the identified idle periods. In an embodiment, while generation of metadata is suspended (outside the idle periods) processor 64 buffers unprocessed media objects in volatile memory until the associated metadata is generated. Alternatively, processor 64 may use any other suitable prioritization scheme for giving precedence to storage/retrieval over metadata generation.

Figure 3:
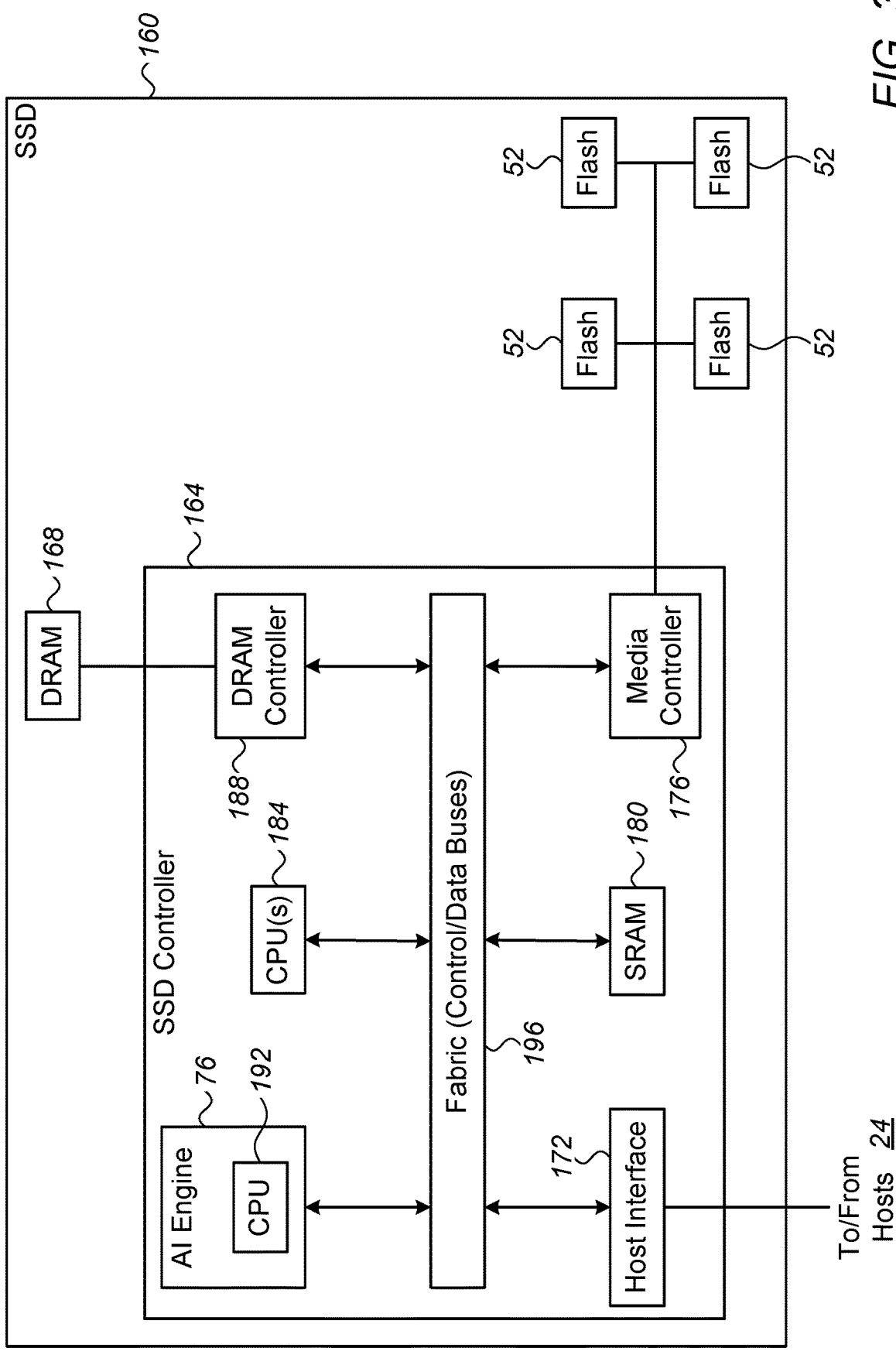
FIG. 3 is a block diagram that schematically illustrates an SSD, in accordance with an embodiment that is described herein.

FIG. 3 is a block diagram that schematically illustrates an SSD 160, in accordance with an alternative embodiment that is described herein. In the present example, SSD 160 comprises multiple Flash devices 52, e.g., NAND Flash memories, an SSD controller 164 and (optionally) a Dynamic RAM (DRAM) 168. SSD controller 164 comprises a host interface 172, a media controller 176, a Static RAM (SRAM) 180, one or more CPUs 184, a DRAM controller 188, and an AI inference engine 76 that optionally comprises a CPU 192.

Host interface 172 communicates with hosts 24, e.g., in accordance with the NVMe, SATA protocol or other suitable storage protocol. Media controller 176 is a processor that manages storage and retrieval of data in Flash devices 52, similarly to Flash management module 72 of FIGS. 1 and 2. DRAM controller 188 manages storage of data in DRAM 168. The various elements of SSD controller 164 communicate with one another via a fabric 196, which typically comprises suitable data and control buses.

Among other features, the example of FIG. 3 demonstrates that in some embodiments the SSD controller (or other storage device controller) comprises multiple processors that jointly perform data storage/retrieval (e.g., storage/retrieval of media objects) and metadata computation. The multiple processors may reside in one or more Integrated Circuits (ICs), packaged in a single package as a single device, or in multiple separate packages.

In some embodiments, one or more processors in the data processing system generate metadata relating to a target feature that is common to media objects of multiple different types. In various embodiments, the processor or processors in question are located at the storage edge and comprise processor 64 in SSD controller 56 of system 20 (FIG. 1) or system 90 (FIG. 2), and/or storage controller (aggregator) 50 of system 20 (FIG. 1). The description that follows refers simply to "the processor" and "the system" for clarity and brevity.

As noted above, in one example embodiment the target feature is a person of interest. In other embodiments, the disclosed techniques can be applied to any other suitable type of target feature that is found in media objects of different types. Some non-limiting examples of target features comprise place names (e.g., an airport, street name or city), companies or other organizations (e.g., company logo, name, text, Campus picture or address), events (e.g., a wedding that can be referenced in a video film, in a text invitation, a voice call or still images of bride and groom), to name just a few examples.

Figure 4:
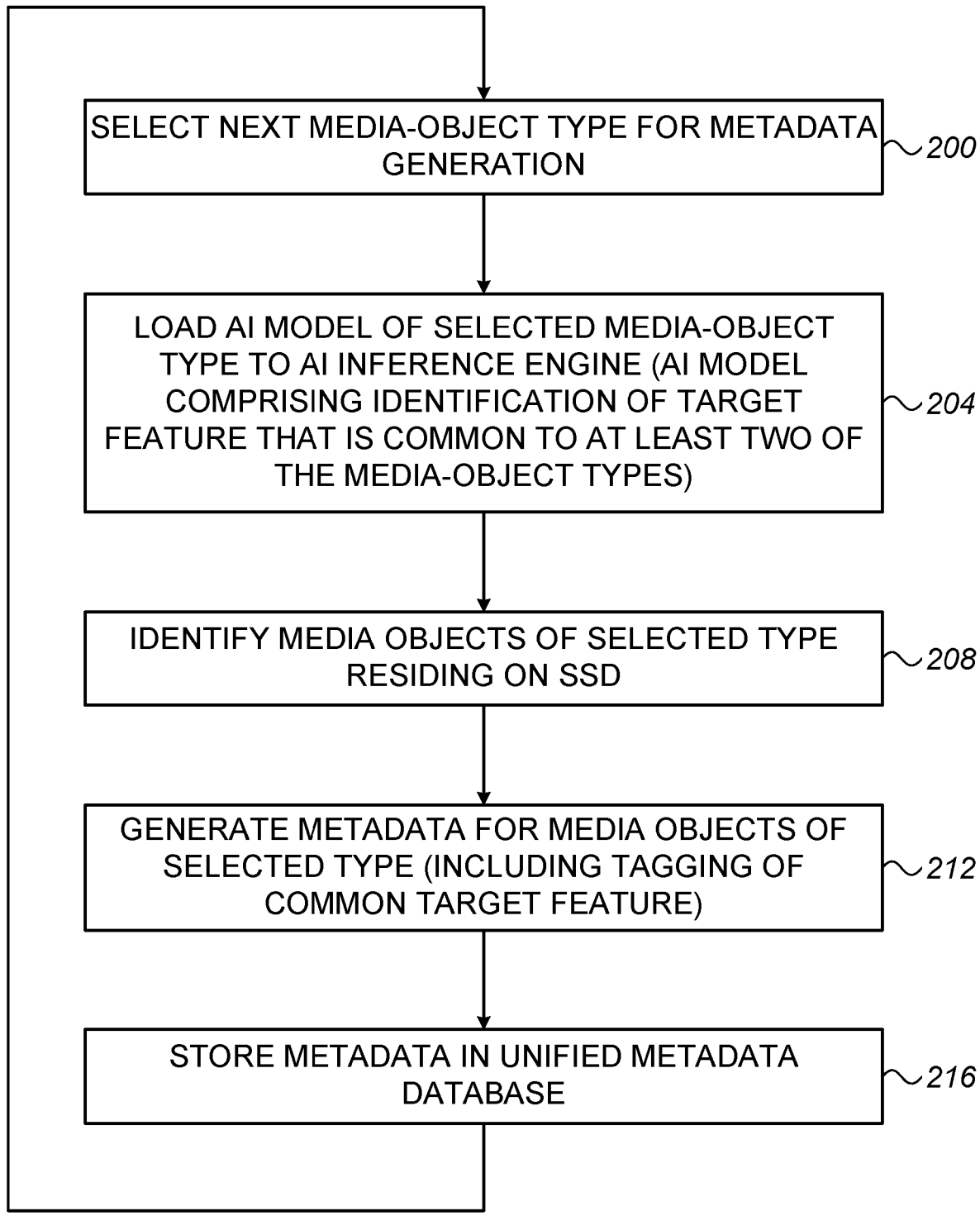
FIG. 4 is a flow chart that schematically illustrates a method for metadata generation, in accordance with an embodiment that is described herein.

FIG. 4 is a flow chart that schematically illustrates a method for metadata generation, in accordance with an embodiment that is described herein.

Typically, the processor receives from one or more of hosts 24 a set of pre-trained AI models, each AI model being configured to generate metadata from objects of a respective media type. For example, the processor may receive an AI model for videos, another AI model for text messages, yet another AI model for audio files, etc. In an embodiment, at least two of the AI models (corresponding to at least two media types) are configured to identify and tag the common target feature.

Typically, the processor comprises, or has access to, a mapping that identifies the various media objects for which metadata is to be computed, their respective locations in the storage device and their respective media types. In one example embodiment, in which the processor is processor 64 of SSD controller 56, the media objects in question are stored in Flash devices 52 of the SSD. In another example embodiment, in which the processor is storage controller (aggregator) 50 of AFA 36, the media objects in question are stored in SSDs 44 of the AFA. A mapping of this sort may be created, for example, by a higher-layer file system or object database. In an example embodiment, the processor receives the mapping from one of hosts 24, along with a command to generate the metadata.

The method begins with the processor selecting a media type for which metadata is to be generated, at a type selection operation 200. At a model loading operation 204, the processor loads the AI model that corresponds to the selected media type to AI inference engine 76. In the present example, each media type corresponds to a single respective AI model. In alternative embodiments, however, such a one-to-one relationship is not mandatory. For example, a certain media type may be associated with several AI models, which are chosen based on other factors.

At an object identification operation 208, the processor identifies (using the above-described mapping) the media objects of the currently selected media type. At a metadata generation operation 212, the processor generates metadata for the media objects of the currently selected media type using the currently loaded AI model. At a database storage operation 216, the processor stores the generated metadata in metadata database 84. The method then loops back to type selection operation 200 above, in which the processor proceeds to select the next media type for metadata generation. An example process of this sort is demonstrated in FIG. 5 below.

Typically, the method of FIG. 4 is carried out continuously, e.g., as a background or low-priority task of the processor. Such continuous operation accounts for, for example, new media objects that continue to arrive for storage over time.

Figure 5:
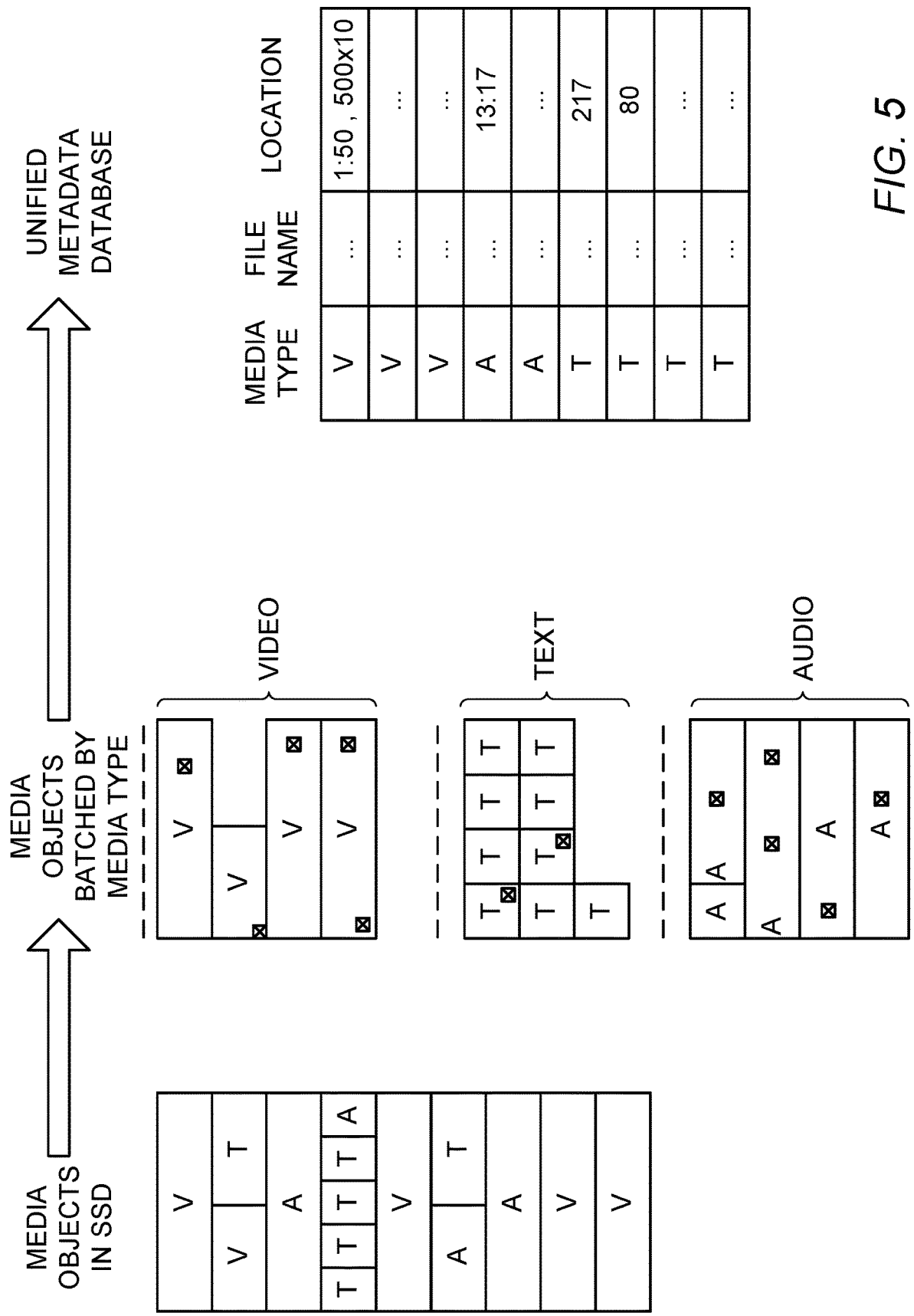
FIG. 5 is a diagram that schematically illustrates a process of producing a unified metadata database, in accordance with an embodiment that is described herein.

In some embodiments, the metadata database 84 created using the method of FIG. 4 is a unified metadata database, which jointly indexes and stores metadata of media objects of multiple different media types. Among other features, the processor tags and indexes at least some of the media objects, belonging to two or more of the media types, in accordance with the common target feature. An example format of a unified metadata database is depicted in FIG. 5 below.

In the example embodiment in which the target feature is a person of interest, the processor tags in the database, for example, references to the person in database files, e-mails and/or text messages, appearances of the person's face in images, videos and/or Web pages, appearances of the person's voice in audio recordings, and the like.

In an embodiment, the processor uses a common identifier to tag the target feature in the various media objects of the multiple different media types in database 84. In another embodiment the processor groups the metadata in database 84 by target features.

Tagging the common target feature in such a unified database enables hosts 24 to efficiently analyze a wide variety of media objects related to the target feature, even when the media objects originate from different sources and/or are of multiple media types and/or are generated at different processors, for instance processors disposed in different storage devices at the storage edge as described in further detail in U.S. patent application entitled "SYSTEMS AND METHODS FOR GENERATING METADATA DESCRIBING UNSTRUCTURED DATA OBJECTS AT THE STORAGE EDGE", U.S. patent application entitled "STORAGE EDGE CONTROLLER WITH A METADATA COMPUTATIONAL ENGINE", U.S. patent application entitled "STORAGE AGGREGATOR CONTROLLER WITH METADATA COMPUTATION CONTROL", and U.S. patent application entitled "METADATA GENERATION AT THE STORAGE EDGE", cited above, whose disclosures are all incorporated herein by reference.

Since the unified database is generated at the storage edge, the disclosed techniques eliminate the need to transport media objects across the network for the sake of computing the metadata. Typically, most if not all of the media objects remain within the boundaries of the storage devices, and it is the metadata that is provided to the hosts for analysis. Based on the metadata, the hosts are able to select which specific media object, or portions thereof, if at all, need to be retrieved over the network. As such, traffic overhead over the computer network is reduced considerably. The disclosed techniques also reduce latency, e.g., because they require less data movement and since they enable distributed metadata generation in parallel by multiple storage-device controllers. Since the disclosed solution lends itself to distributed implementation across multiple storage devices, the solution is highly scalable. Since the disclosed technique improves metadata generation speed, it responds rapidly to updates of media objects.

In one example implementation, each entry in unified metadata database 84 represents an appearance of the common target feature. Each entry comprises, at least: (i) the media type of the media object, (ii) file identifier of a file in which the media object resides or will be stored, and (iii) the location of appearance of the target feature within the media object. Any other suitable data structure or representation can be used.

The processor typically expresses the location of appearance by a location metric that is suitable for the type of media. In various embodiments, the locations of appearance comprise, for example, a frame number or elapsed time from the beginning of a video, coordinates within a frame in a video or still image (e.g., coordinates of a diagonal of a rectangle surrounding the target feature), elapsed time in an audio file, the number of words from the beginning of a textual object, or any other suitable location metric.

The method flow of FIG. 4 is an example flow that is depicted solely for the sake of conceptual clarity. In alternative embodiments, any other suitable method can be used for metadata computation and creation of a unified metadata database. For example, the description above refers mainly to metadata generation for media objects that are already stored in non-volatile memory (NVM). Additionally or alternatively, the disclosed techniques can also be used for generating metadata for media objects that are on-the-fly, i.e., en-route to being stored in the NVM.

FIG. 5 is a diagram that schematically illustrates a process of producing a unified metadata database, in accordance with an embodiment that is described herein. In the example of FIG. 5, the target feature is a person of interest, and the media objects being processed are stored on a certain SSD.

The left-hand side of FIG. 5 shows multiple media objects of multiple media types intermixed on the SSD. In this embodiment, objects marked "V" are video objects, objects marked "A" are audio objects, and objects marked "T" are textual objects.

The middle of FIG. 5 shows the stage at which the media objects are batched by media type, ready for batch processing by the AI inference engine. As seen, video objects, audio objects and textual objects are batched separately. Appearances of the common target feature (references to the person of interest in this example) within the objects are marked "x". As seen, the target feature appears in objects of multiple media types. Some objects comprise multiple occurrences of the target feature, other objects comprise a single occurrence, and in yet other objects the target feature does not appear at all.

The right-hand side of FIG. 5 shows the unified metadata database created by the processor at the storage edge, e.g., by processor 64 of SSD controller 56 or by aggregator 50. Each entry in the unified metadata database corresponds to a respective occurrence of the common target feature. Each entry specifies attributes such as the media type of the media object ("V", "A" or "T" in the present example), a unique identifier of the file including for example the file name and its storage location, and the location of the occurrence of the target feature within the file.

The system and storage device configurations depicted in FIGS. 1-3 above, and the database configuration depicted in FIG. 5 above, are example configurations, which were chosen solely for the sake of conceptual clarity. FIGS. 1-3 show example configurations in which a controller of a storage device (e.g., an SSD controller in an SSD or an aggregator of an AFA) communicates over a computer network with one or more remote hosts, and locally with the NVM of the storage device. The controller comprises one or more processors that jointly compute and store in the NVM metadata of media objects that are stored, or that are to be stored, in the NVM. In alternative embodiments, any other suitable system and/or storage-device configuration can be used. Elements that are not mandatory for understanding of the disclosed techniques have been omitted from the figures for the sake of clarity.

In alternative embodiments, the disclosed techniques can be used with other suitable types of storage devices, e.g., Hard Disk Drives (HDDs) in which the storage medium is magnetic.

The various elements of data processing systems 20 and 90, and of their components such as SSDs 44 and 114 and AFA 36 and its components, as well as SSD 160 and its components, e.g., AI inference engine 76, may be implemented using dedicated hardware or firmware, such as using hard-wired or programmable logic, e.g., in an Application-Specific Integrated Circuit (ASICs) or Field-Programmable Gate Array (FPGA), using software, or using a combination of hardware and software elements.

Typically, processor 64 of SSD controller 56, aggregator 50, CPU 184 and/or CPU 192 comprise programmable processors, which are programmed in software to carry out the functions described herein (e.g., Flash management and metadata computation). The software may be downloaded to the processor in electronic form, over a network, for example, or it may, alternatively or additionally, be provided and/or stored on non-transitory tangible media, such as magnetic, optical, or electronic memory.

Although the embodiments described herein mainly address media processing, the methods and systems described herein can also be used in other applications, such as in behavior analytics of people.

Although the embodiments described herein mainly address metadata generation at the storage edge, the methods and systems described herein can also be used for metadata generation by a processor or processors located on the host-side of the network. Hybrid solutions, in which metadata generation tasks are partitioned between processors at the storage edge and on the host side, are also feasible.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Metadata computation apparatus, comprising:
   a host interface, configured to communicate over a computer network with one or more remote hosts;
   a storage interface, configured to communicate with one or more non-volatile memories of one or more storage devices; and
   one or more processors, configured to:
     manage local storage or retrieval of media objects in the one or more non-volatile memories;
     compute metadata for a plurality of the media objects that are stored, or that are en-route to be stored, on the one or more storage devices, wherein the media objects are of multiple media types, at least some of the media objects being unstructured media objects, and wherein the computed metadata comprises a common identifier assigned to locations at which a same common target feature appears in both (i) first unstructured media objects of a first media type and (ii) second unstructured media objects of a second media type, different from the first media type, the locations computed in accordance with different location metrics that are respectively defined for the respective media types; and store, in the one or more non-volatile memories, the metadata comprising the common identifier assigned to the common target feature found in the at least two different media types, for use by the one or more hosts.

2. The metadata computation apparatus according to claim 1, wherein, for a media item that comprises a sequence of frames, the one or more processors are configured to identify and assign the common identifier to one or more of the frames in which the common target feature appears.

3. The metadata computation apparatus according to claim 1, wherein, for a media item that comprises at least a frame, the one or more processors are configured to identify and assign the common identifier to one or more coordinates in the frame in which the common target feature appears.

4. The metadata computation apparatus according to claim 1, wherein the one or more processors are configured to receive from the one or more hosts, over the computer network, one or more models that specify extraction of the metadata from the media objects, and to generate the metadata based on the received models.

5. The metadata computation apparatus according to claim 4, wherein the one or more processors are configured to receive from the one or more hosts a respective model for each of the multiple media types.

6. The metadata computation apparatus according to claim 4, wherein the one or more processors are configured to receive, as the one or more models, one or more pre-trained Artificial Intelligence (AI) models.

7. The metadata computation apparatus according to claim 6, wherein the one or more processors are configured to generate the metadata by applying a same AI inference engine to the AI models.

8. The metadata computation apparatus according to claim 1, wherein the one or more processors are configured to organize the media objects in multiple batches corresponding to the media types, and to compute the metadata over each of the batches.

9. The metadata computation apparatus according to claim 1, wherein the one or more processors are configured to generate the metadata during idle periods during which at least some resources of the one or more processors are free from managing storage of the media objects.

10. The metadata computation apparatus according to claim 1, wherein the one or more processors are configured to combine the metadata, which assigns the common identifier to the common target feature, in a unified metadata database that identifies at least one attribute selected from a group of attributes consisting of a media type, a file identifier of a file containing the media object, and a location of the media object within the file.

11. Metadata computation apparatus, comprising:
a host interface, configured to communicate over a computer network with one or more remote hosts;
a storage interface, configured to communicate with one or more non-volatile memories of one or more storage devices; and
one or more processors, configured to:

manage local storage or retrieval of media objects in the one or more non-volatile memories;
compute metadata for a plurality of the media objects that are stored, or that are en-route to be stored, on the one or more storage devices, wherein the media objects are of multiple media types, and wherein the computed metadata comprises a common identifier assigned to occurrences of a same common target feature in both (i) first media objects of a first media type and (ii) second media objects of a second media type, different from the first media type; and
store, in the one or more non-volatile memories, the metadata comprising the common identifier assigned to the common target feature found in the at least two different media types, for use by the one or more hosts, including combining, in a unified metadata database, metadata that comprises the common identifier assigned to the common target feature and that was extracted from different media sources or extracted by different processors.

12. A method for metadata computation, the method comprising:
communicating by a storage controller of one or more storage devices over a computer network with one or more remote hosts, and communicating with one or more non-volatile memories of the one or more storage devices;
using the storage controller, managing local storage or retrieval of media objects in the one or more non-volatile memories, computing metadata for a plurality of the media objects that are stored, or that are en-route to be stored, on the one or more storage devices, wherein the media objects are of multiple media types, at least some of the media objects being unstructured media objects, and wherein the computed metadata comprises a common identifier assigned to locations at which a same common target feature appears in both (i) first unstructured media objects of a first media type and (ii) second unstructured media objects of a second media type, different from the first media type, the locations computed in accordance with different location metrics that are respectively defined for the respective media types; and
storing the metadata, which comprises the common identifier assigned to the common target feature found in the at least two different media types, in the one or more non-volatile memories for use by the one or more hosts.

13. The method for metadata computation according to claim 12, wherein, for a media item that comprises a sequence of frames, assigning the common identifier to the locations comprises identifying and assigning the common identifier to one or more of the frames in which the common target feature appears.

14. The method for metadata computation according to claim 12, wherein, for a media item that comprises at least a frame, assigning the common identifier to the locations comprises identifying and assigning the common identifier to one or more coordinates in the frame in which the common target feature appears.

15. The method for metadata computation according to claim 12, comprising receiving from the one or more hosts, over the computer network, one or more models that specify extraction of the metadata from the media objects, and generating the metadata based on the received models.

16. The method for metadata computation according to claim 15, wherein receiving the models comprises receiving from the one or more hosts a respective model for each of the media types.

17. The method for metadata computation according to claim 15, wherein receiving the models comprises receiving one or more pre-trained Artificial Intelligence (AI) models.

18. The method for metadata computation according to claim 17, wherein computing the metadata comprises applying a same AI inference engine to the AI models.

19. The method for metadata computation according to claim 12, wherein computing the metadata comprises organizing the media objects in multiple batches corresponding to the media types, and computing the metadata over each of the batches.

20. The method for metadata computation according to claim 12, wherein computing the metadata comprises generating the metadata during idle periods during which at least some resources of the storage controller are free from managing storage of the media objects.

21. The method for metadata computation according to claim 12, wherein storing the metadata comprises combining the metadata, which comprises the common identifier assigned to the common target feature, in a unified metadata database that identifies at least one attribute selected from a group of attributes consisting of a media type, a file identifier of a file containing the media object, and a location of the media object within the file.

22. A method for metadata computation, the method comprising:
  communicating by a storage controller of one or more storage devices over a computer network with one or more remote hosts, and communicating with one or more non-volatile memories of the one or more storage devices;
  using the storage controller, managing local storage or retrieval of media objects in the one or more non-volatile memories, computing metadata for a plurality of the media objects that are stored, or that are en-route to be stored, on the one or more storage devices, wherein the media objects are of multiple media types, and wherein the computed metadata comprises a common identifier assigned to occurrences of a same common target feature in both (i) first media objects of a first media type and (ii) second media objects of a second media type, different from the first media type; and
  storing the metadata, which comprises the common identifier assigned to the common target feature found in the at least two different media types, in the one or more non-volatile memories for use by the one or more hosts, including combining, in a unified metadata database, metadata that comprises the common identifier assigned to the common target feature and that was extracted from different media sources or extracted by different processors.

* * * * *